US011450039B2

(12) United States Patent
Chen

(10) Patent No.: US 11,450,039 B2
(45) Date of Patent: Sep. 20, 2022

(54) VISUALIZATION OF SPATIAL DISTRIBUTIONS

(71) Applicant: Purdue Research Foundation, West Lafayette, IN (US)

(72) Inventor: Yingjie Chen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 158 days.

(21) Appl. No.: 16/914,351

(22) Filed: Jun. 27, 2020

(65) Prior Publication Data

US 2020/0410728 A1    Dec. 31, 2020

Related U.S. Application Data

(60) Provisional application No. 62/867,343, filed on Jun. 27, 2019.

(51) Int. Cl.
| | |
|---|---|
| *G06T 11/20* | (2006.01) |
| *G06V 10/25* | (2022.01) |
| *G06V 10/44* | (2022.01) |
| *G06V 10/50* | (2022.01) |
| *G06V 30/422* | (2022.01) |

(Continued)

(52) U.S. Cl.
CPC .......... *G06T 11/203* (2013.01); *G06V 10/25* (2022.01); *G06V 10/44* (2022.01); *G06V 10/50* (2022.01); *G06V 30/422* (2022.01); *G09B 29/007* (2013.01)

(58) Field of Classification Search
CPC ..... G06T 11/203; G06T 11/206; G06V 10/25; G06V 10/267; G06V 10/44; G06V 10/50; G06V 30/422; G09B 29/007
See application file for complete search history.

(56) References Cited

U.S. PATENT DOCUMENTS

| | | | | |
|---|---|---|---|---|
| 2006/0018460 | A1* | 1/2006 | McCree | H04M 9/082 379/406.08 |
| 2011/0046999 | A1* | 2/2011 | Nielsen | G06Q 10/063 705/7.11 |

OTHER PUBLICATIONS

Central Park Conservancy, "Report on the Public Use of Central Park," New York, NY, Apr. 2011 (Year: 2011).*

(Continued)

*Primary Examiner* — Sing-Wai Wu
(74) *Attorney, Agent, or Firm* — Purdue Research Foundation

(57) ABSTRACT

A mapping method for identifying density which includes determining at least one geographical boundary about a geographical location of interest, the at least one geographical boundary is free of any self-intersections, dividing the at least one geographical boundary into a plurality of regions of interests, each region of interest is defined by a start point and an end point on the at least one geographical boundary, wherein the end point associated with one region of interest coincides with a start point of a neighboring region of interest wherein the region of interest falls within the at least one geographical boundary, for each of the plurality of regions of interest, calculating at least one parameter of interest within the region of interest, and graphically presenting a segment between the start point and the end point on the at least one geographical boundary with a line thickness proportional to the calculation results.

18 Claims, 18 Drawing Sheets

(7 of 18 Drawing Sheet(s) Filed in Color)

(51) Int. Cl.
  G09B 29/00       (2006.01)
  G06V 10/26       (2022.01)

(56) References Cited

OTHER PUBLICATIONS

G. M. Jacquez, "Geographic boundary analysis in spatial and spatio-temporal epidemiology: perspective and prospects," Spatial and spatio- temporal epidemiology, vol. 1, No. 4, pp. 207-218, 2010.

A. Moreira et al., "Concave hull: A k-nearest neighbors approach for the computation of the region occupied by a set of points," Proceedings of the 2nd International Conference on Computer Graphics Theory and Applications (GRAPP 2007), Barcelona, Spain, pp. 61-68, 2006.

R. Maciejewski et al., "A visual analytics approach to understanding spatiotemporal hotspots," IEEE Transactions on Visualization and Computer Graphics, vol. 16, No. 2, pp. 205-220, 2010.

J. McPherson and W. Jetz, "Type and spatial structure of distribution data and the perceived determinants of geographical gradients in ecology: the species richness of african birds," Global Ecology and Biogeography, vol. 16, No. 5, pp. 657-667, 2007.

S. Kim et al., "Bristle maps: A multivariate abstraction technique for geovisualization," IEEE Transactions on Visualization and Computer Graphics, vol. 19, No. 9, pp. 1438-1454, 2013.

D. Kao et al., "Visualizing 2d probability distributions from eos satellite image-derived data sets: A case study," in Proceedings of the conference on Visualization'01. IEEE Computer Society, 2001, pp. 457-460.

D. W. Scott, "Multivariate density estimation and visualization," in Handbook of computational statistics. Springer, 2012, pp. 549-569.

P. Tongkumchum, "Two-dimensional box plot," Songklanakarin Journal of Science and Technology, vol. 27, No. 4, pp. 859-866, 2005.

K. M. Goldberg et al., "Bivariate extensions of the boxplot," Technometrics, vol. 34, No. 3, pp. 307-320, 1992.

J. Chae et al., "Public behavior response analysis in disaster events utilizing visual analytics of microblog data," Computers & Graphics, vol. 38, pp. 51-60, 2014.

C. A. Brewer et al., "Evaluation of methods for classifying epidemiological data on choropleth maps in series," Annals of the Association of American Geographers, vol. 92, No. 4, pp. 662-681, 2002.

C. Panse et al., "Visualization of geo-spatial point sets via global shape transformation and local pixel placement," IEEE Transactions on Visualization and Computer Graphics, vol. 12, No. 5, pp. 749-756, 2006.

R. Scheepens et al., "Composite density maps for multivariate trajectories," IEEE Transactions on Visualization and Computer Graphics, vol. 17, No. 12, pp. 2518-2527, 2011.

R. Scheepens et al., "Contour based visualization of vessel movement predictions," International Journal of Geographical Information Science, vol. 28, No. 5, pp. 891-909, 2014.

C. Tominski et al., "Stacking-based visualization of trajectory attribute data," IEEE Transactions on visualization and Computer Graphics, vol. 18, No. 12, pp. 2565-2574, 2012.

P. Baudisch et al., "Halo: a technique for visualizing off-screen objects," in Proceedings of the SIGCHI Conference on human factors in computing systems, ser. CHI '03. ACM, 2003, pp. 481-488.

D. Jäckle et al., "Topology-preserving off-screen visualization: Effects of projection strategy and intrusion adaption," arXiv preprint arXiv:1706.09855, 2017.

D. A. Keim et al., "Generalized scatter plots," Information Visualization, vol. 9, No. 4, pp. 301-311, 2010.

A. Mayorga et al., "Splatterplots: Overcoming overdraw in scatter plots," IEEE Transactions on Visualization and Computer Graphics, vol. 19, No. 9, pp. 1526-1538, 2013.

M. Li et al., "ConcaveCubes: Supporting Cluster-based Geographical Visualization in Large Data Scale," Computer Graphics Forum, 2018.

T. Neuroth et al., "Scalable visualization of time-varying multiparameter distributions using spatially organized histograms," IEEE transactions on visualization and computer graphics, vol. 23, No. 12, pp. 2599-2612, 2017.

K.-C. Wang et al., "Statistical visualization and analysis of large data using a value-based spatial distribution," in Pacific Visualization Symposium (PacificVis), 2017 IEEE. IEEE, 2017, pp. 161-170.

Heer, "A tour through the visualization zoo." Communications of the ACM 53.6 (2010): 59-67.

\* cited by examiner

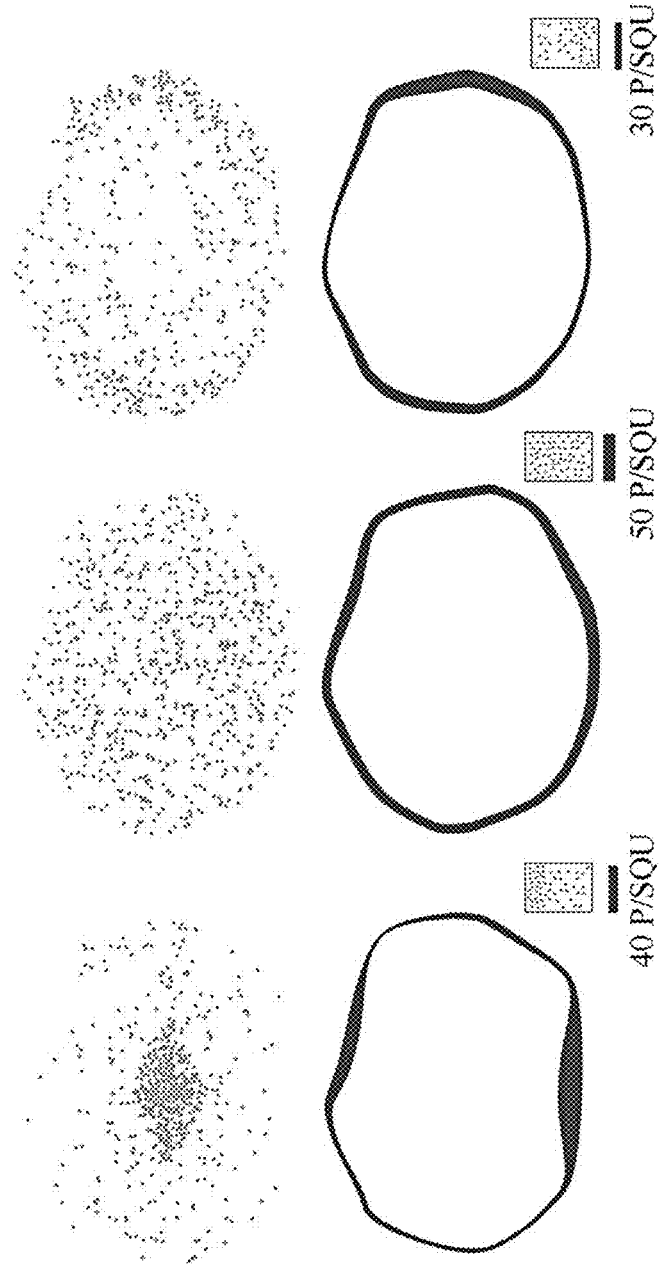

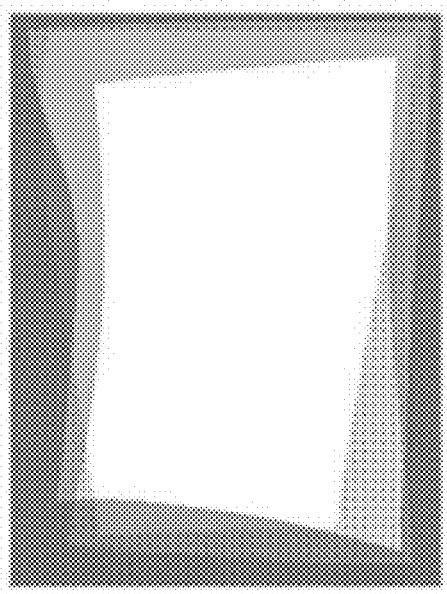
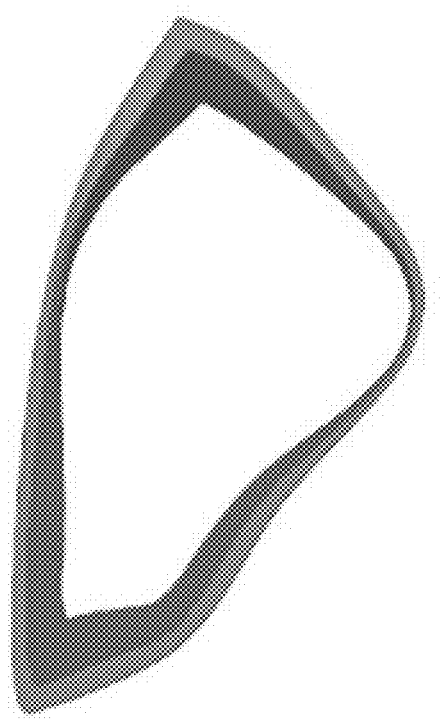
FIG. 7

VISUALIZATION OF SPATIAL DISTRIBUTIONS

CROSS-REFERENCE TO RELATED APPLICATIONS

The present patent application is related to and claims the priority benefit of U.S. Provisional Patent Application Ser. No. 62/867,343, filed 27 Jun. 2019, the contents of which are hereby incorporated by reference in its entirety into the present disclosure.

STATEMENT REGARDING GOVERNMENT FUNDING

None.

TECHNICAL FIELD

The present disclosure generally relates to mapping technologies, and in particular to mapping technologies involving compressing large scale of spatially varying data for improved visualization.

BACKGROUND

This section introduces aspects that may help facilitate a better understanding of the disclosure. Accordingly, these statements are to be read in this light and are not to be understood as admissions about what is or is not prior art.

Mapping has evolved over time; nowadays technology allowing more robust visualization of mapping data than ever. In many instances a user may wish to see one or more parameters of interest overlaid on a geographical map. Such visualization in effect represents compression of large scale data. Examples of such visualization are commonplace. Perhaps the most recognizable example is a map of cellphone coverage offered by cellphone companies. Highly dense concentrations are shown by darker colors, while low-density concentrations are shown by lighter colors. These kinds of maps are typically referred to as generally called heatmap or Choropleth Map. Another often seen example represent political maps, where voters associated with one political party is shown in one color and voters associated with another political party are shown in another color. Again, highly dense concentrations are shown by darker colors, while low-density concentrations are shown by lighter colors. Colors and other such delimiting features work well when there is one parameter of interest (e.g., cellphone coverage comparisons between one or another cellphone provider, or concentration of voters in a geographical area), however, overlaying such maps resulting in confusion. Suppose, two cellphone providers' coverage maps, one in red and one in blue, are overlaid on one another. The result would be difficult to interpret. Now suppose a third provided is added. The results would be difficult to impossible to interpret for an ordinary consumer. Similarly, suppose there are three, four, or five political parties. Providing a map of voter concentration overlaid on one another would be difficult to impossible to interpret for a casual observer.

Additionally, modern GIS, GPS, and remote sensing technologies have enabled us to capture large amounts of geospatial data effortlessly. The rich data captured is full of information and can be crucial for analytic practice and decision making. One essential step is to visualize this data semantically on maps for analysts to identify trends and anomalies, or make comparisons. Often, people need to determine how a distribution changes over time, or compare distributions in multiple instances. However, due to rapid increases in amounts of data collected, modern data aggregation strategies face numerous challenges. For example, generic distribution outputs are unable to convey intuitive results to observers and lack specificity about the data's location. Some prior art attempt to identify broad-scale patterns in the diversity of endangered species' living environments by overlaying their range maps, but finds that the elusive spatial structure in species richness patterns makes it difficult to draw concrete conclusions. Practitioners and researchers have developed multiple strategies to visualize data at different granularity levels, from raw data to data in various aggregated forms. Some of these strategies include adding direction, plotting event points on a map, visualizing points as a continuous function as a heatmap.

Apart from these technical challenges, there remains the unresolved problems of how to visually illustrate the distribution of objects from many different categories and the distribution of one kind of object over time. This is a typical spatiotemporal problem. To demonstrate the distribution of changes over time, one solution is to automatically (or manually) animate a sequence of visualizations in order. However, the user can experience cognitive overload if they are required to compare earlier and current scenes, especially if they also need to identify multiple differences among scenes. As a result, it is common to use small multiples of geo-visualizations to compare multiple distributions. In doing so, users can compare maps from different cells. However, this conventional solution also suffers from two problems. First, due to the limited screen size, the visualization dimension in each cell may not display sufficient details. Second, it is also cognitively challenging to compare visualizations across multiple cells. In some cases, the "small multiples" approach directly plots points on the map, with colors or shapes to distinguish temporal points. However, this outcome can easily lead to cluttering, which causes perceptional confusions.

Spatial distribution data can be widely found in many domains, such as census data, bird migration data, agricultural data, weather forecasts, and water contamination data. Nature boundaries (e.g. coastlines, rivers, roads) or political boundaries often influence these geographical phenomena. The analysis focuses on the outlines of the data points and requires general geographical information to serve as the basis. The difficulty of visualizing spatial distribution data comes from the distribution's widespread scope and variability. Aggregation and parametric statistics are usually employed to visualize the density estimates and map distribution with color, length, height, dot, texture, and glyphs.

A box plot is one of the most popular methods to visualize the distribution of a set of values. According to one prior art "two-dimensional box plot" shows the general characteristics of the 2D points: location, spread, correlation, and skewness. Another variation of the box plot is the "quelplot and relplot". This approach uses a pair of ellipses as a hinge and a fence to show location, scale, correlation, and a resistant regression line. Box plot is a simple way to present the spread and skewness of a distribution. However, it cannot display a complicated distribution or provide the exact values and details of the distribution.

A major challenge in traditional mapping techniques is that any use of dots or colored glyphs for data locations may easily cause overdrawing and hide distribution status. To address this issue, researchers adopt heatmaps to visualize the massive size of the point cloud. Point mapping, choropleth mapping, and kernel density estimation (KDE) are the most widely used heatmapping methods. One prior art employed KDE heatmaps to estimate event distributions in the spatial realm. These systems also use contour histories to provide the user with a spatiotemporal view of current and past data trends, which is helpful for tracking hotspot movement over time. One prior art developed a geospatial heatmap to visualize and explore patterns in the spatial distribution of Twitter users over time. This visualization system supports disaster management by identifying abnormal patterns and evaluating varying-density population areas to determine changes in movement. There have been many attempts employing a choropleth map to encode one variable accurately on a map. A choropleth map displays a colored, shaded, or patterned area in proportion to a data variable. Some research has expanded this idea by adding color blending, color weaving, texture overlays, and animation. Another prior art combines a cartogram-based layout with a pixel-oriented method to preserve local distributions and avoid overplotting in a large geospatial point set. The pixel-oriented approach trades the absolute and relative positions against clustering for pixel coherence and overlap reduction, but it cannot easily show geographic features and relationships between regions. In contrast, cartograms preserve geospatial positions from the dataset. The combination of cartograms and the pixel-oriented method addresses the overplotting problems while preserving the spatial features of the map. However, these techniques generally occupy a large portion of the screen's real estate. As such, it is difficult to apply these techniques to represent multiple distributions within a single view.

To visualize multivariate spatial data, Bristle maps use a variety of graphical properties of a line (length, density, color, transparency, and orientation) to encode a set of variables in large amounts of point data. The topology graph can be used to reduce clutter and overlapping. However, it might be overwhelming for a designer when facing a large number of variables to select a proper combination for visual encoding. Also, the spatial information in the visualization is restricted to "road" level. To tackle the difficulty of visualizing a multi-dimensional dataset in spatio-temporal distributions, one prior art introduced a method of compositing density maps for aggregating the multivariate trajectories of moving objects. They used contours to visualize traffic-related probability-density fields on spatio-temporal zones. This visualization system is able to predict the future positions of selected moving objects. Another prior art used 2D maps to represent spatial context, and stacked 3D trajectory bands to encode trajectories and attribute data. This visualization tool integrates space, time, and attributes. These visual encoding techniques are particularly effective on traffic-related topics when many objects move along the same routes, but may not be applicable to discern changes of activities spread across a large area.

When reviewing the prior art, it should be noted that most spatial visualization techniques of the prior art deal with objects within the map that is displayed on a screen. However, several approaches have been developed to show objects outside of the screen. Outside objects are projected to the boundary area of the display using orthographic or radial projection methods. One such approach uses arc with different radii along screen edges to show the direction and distance of objects outside of the screen. Another approach was able to show numerous off-screen objects in a limited boundary area and maintain the topology relationship among objects. These approaches aim to provide users with better awareness of relative locations of objects. Although these approaches are designed to show off-screen objects, the projection approach can be applied to on-screen objects. Less important on-screen objects could be projected to a boundary showing contextual information, while keeping the inside screen real estate for more important items. Such an approach could be useful for enhancing the scalability of the limited screen space. These off-screen approaches focus on dealing with individual objects in space. However, similar to other spatial visualization techniques such as dotmaps, heatmaps and the like, this approach would still not be able to handle data that are large in quantity or change over time.

Another approach in the prior art for conveying information is a scatter plot. A scatter plot places points on a Cartesian coordinate system to show the relation between two dimensions. One common setback of scatter plots is that overlapping and overplotting can occur when too many objects are plotted, which could potentially lead to occlusion of a significant portion of data values. To allay this shortcoming, one prior art presented a generalized scatter plot to improve the unsatisfying outcome of a generic scatter plot occluding a significant portion of the dataset shown. This advanced scatter plotter shows a much clearer distribution than traditional scatter plots, but the lack of quantitative estimation caused by overlapping is still a problem. To overcome the overlapping issue, another prior art introduced "Splatterplots" that use contours for bounding the overlapping distributions. However, intersections between the contours when they are combined may cause visual complexity. Furthermore, Splatterplots leave little extra space on the graph when showing the intersections. It limits the graphical space for the designers and hinders its readability.

Therefore, there is an unmet need for a novel approach in mapping technology to compress large scales of spatial data in a manner that is easy to interpret.

SUMMARY

A mapping method for identifying density of one or more parameters of interest positioned within a boundary is disclosed. The method includes determining at least one geographical boundary about a geographical location of interest, the at least one geographical boundary is free of any self-intersections. The method also includes dividing the at least one geographical boundary into a plurality of regions of interests, each region of interest is defined by a start point and an end point on the at least one geographical boundary, wherein the end point associated with one region of interest coincides with a start point of a neighboring region of interest wherein the region of interest falls within the at least one geographical boundary. For each of the plurality of regions of interest the method also includes calculating at least one parameter of interest within the region of interest, and graphically presenting a segment between the start point and the end point on the at least one geographical boundary with a line thickness proportional to the calculation results.

A mapping method for identifying density of one or more parameters of interest positioned outside a boundary is also disclosed. The method includes receiving at least one predetermined geographical boundary about a geographical location of interest, the at least one geographical boundary is free of any self-intersections. The method further includes dividing the at least one geographical boundary into a plurality of regions of interests, each region of interest is defined by a start point and an end point on the at least one geographical boundary, wherein the end point associated with one region of interest coincides with a start point of a neighboring region of interest, wherein the region of interest falls outside the at least one geographical boundary. For each of the plurality of regions of interest the method includes calculating at least one parameter of interest within the region of interest, and graphically presenting a segment between the start point and the end point on the at least one geographical boundary with a line thickness proportional to the calculation results.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 2a-2c depict various steps of the method of the present disclosure, wherein FIG. 2a depicts placement of boundary about a population in a geographical area, FIG. 2b, shifts the boundary outward by a small amount, and FIG. 2c depicted the shifted boundary smoothed to remove sharp corners.

FIGS. 5a-5d depict various operations of the present method, wherein FIG. 5a shows raw population about a geographical area, FIGS. 5b-d show effect of a moving average filter, wherein FIG. 5b shows Segments=3000 and Sliding Window=70, FIG. 5c shows Segments=3000 and Sliding Window=150, and FIG. 5d shows Segments=3000 and sliding window=300.

FIGS. 6a-6c demonstrates the generic distribution trends for three different scenarios: normal distribution (FIG. 6a), in which objects are more dense toward the center of the region; uniform distribution (FIG. 6b), in which objects are scattered uniformly in the range; and close-to-edge distribution (FIG. 6c), in which objects are more dense toward the edge.

FIG. 7 shows examples of use of color and transparency where there are multiple parameters of interest within a boundary.

FIGS. 8-1, 8-2, 8-3 provide a flowchart of a mapping method for identifying density of one or more parameters of interest positioned within a boundary, according to the present disclosure.

FIGS. 9-1, 9-2, 9-3 provide a flowchart of a mapping method for identifying density of one or more parameters of interest positioned outside a boundary, according to the present disclosure.

DETAILED DESCRIPTION

Figure 1:
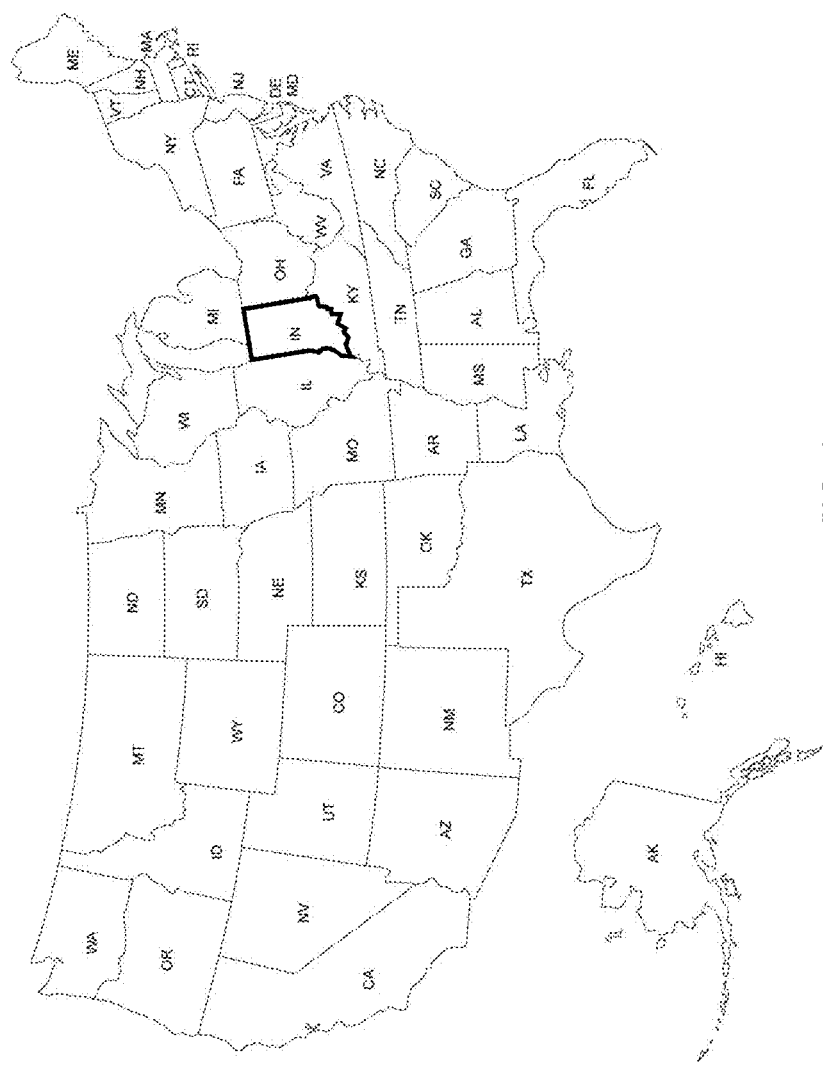
FIG. 1 is a map of the United States, with the boundary of the State of Indiana highlighted.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel methodology is provided in mapping technology to compress large scales of spatial data in a manner that is easy and effective to interpret. The method according to the present disclosure is based on an algorithm that starts with a geographical boundary. The geographical boundary is either received as apriori data or determined based on one or more parameters. Towards this end, the method of the present disclosure, summarizes and constructs a spatial distribution into an outline with various widths (thicknesses). The outline can be determined from the boundary of a fixed region (e.g., a room or a political boundary) or computed based on X/Y coordinates using an algorithm such as a concave/convex hull. The width of each segment represents the density of the segment's corresponding area that is adjacent to the segment. Thus, a user can comfortably perceive the region of the objects and quickly estimate the density of subjects in different areas in the region. In addition, the method of the present disclosure can provide a single view of multiple spatial distributions without interruption. Given its simple visual form, the system can overlap several outlines on the map to represent multiple distributions at once. Assigning a gradient of colors to the curves can show a distribution change over time. By assigning colors with different hues to distinguish time periods or species, the user can quickly present multiple distributions for different kinds of objects on the same map.

To address the shortcomings of the prior art, the method according to the present disclosure visualizes the construction of the distribution but still preserves spatial information and reduces clutter. In other words, the present method focuses on depicting general characteristics of spatial distribution in a more flexible and robust manner with greater detail.

The method of the present disclosure tackles the difficulties in geospatial visualization, including: (1) The cognitive overload caused by the juxtaposition of numerous graphs, (2) The limitations of current geo-visualization methods that do not provide effective solutions to overlapping data points, and (3) The need for more effective use of screen real estate, as in the case of heatmapping; where the visualization leaves little space for displaying other information, because of the large areas covered with colors and shading. The novel approach of the present disclosure allows users to perceive and compare multiple geospatial distribution data, where the distribution data belong to various types of objects or the distribution changes over time.

The method of the present disclosure address these needs by visualizing multiple spatial distributions. In geospatial data, for example, in dealing with distributions of an animal species over time, we normally care about the range and the number of animals in various places within that range. The range can be seen as an outline enclosing many 2D data points. In a heatmap, density is represented by hue and shading, where darker color means higher density; however, the boundary between high and low densities is usually blurry. In contrast, dot density maps directly reflect raw data and show exact locations, which often makes it difficult for users to estimate density. Psychological and aesthetic factors are also taken into account.

The new approach of the present disclosure represents both range and density. For a group of points on a 2D map, first an enclosed curve is defined as the outline, then different widths are defined to segments of the outline to show the point density in the areas within and adjacent to each curve segment. This approach helps users to estimate the quantitative density and distribution of the data more quickly when they use the method of the present disclosure (also referred to herein as the Phoenixmap) for data interpretation.

With respect to data aggregation, the method of the present disclosure first requires an outline to surround the data points. In a real-world problem, there are two ways of determining such an outline: 1) Use a predefined outline. Sometimes objects are distributed within a fixed scope. For example, consider observing objects' movements in a room. The walls make a natural outline regarding the range of the spatial distributions. For geographic regions, outlines can be derived directly from political boundaries or natural topography like coastal lines and rivers. 2) Compute an outline. When objects are distributed freely in nature without a natural physical or political boundary, the outline needs to be computed from the data points.

To demonstrate this new approach an example is shown in FIG. 1. The geographical boundary may be based on a state outline. Referring to FIG. 1, the state of Indiana is shown in the map of the United States, with the geographical boundary highlighted in a thickened line. This boundary can be provided as apriori data, e.g., using computer graphics algorithms (e.g. convex hull or concave hull), known to a person having ordinary skill in the art, or predefined by a user. For example, suppose a user of the method of the present disclosure is interested in determining concentration of individuals who typically vote for one political party vs. others who vote for another political party. The method of the present disclosure is configured to provide, as will be discussed later, a visualization of this parameter (political affiliation) about the geographical boundary of the State of Indiana. If the same is done for the State of Ohio (neighboring state of the State of Indiana), a new geographical boundary can be drawn by a user or automatically by the method of the present disclosure to include a certain concentration of individuals in the states of Indiana and Ohio that are affiliated with one of the political parties. Such a map can be used for a variety of different reasons. Another example could be showing birds migration—How do birds' activity range change over time, e.g. week by week. For example, a person interested in living near other politically-minded persons, can use this new boundary to decide where to live. While in the present disclosure, the term geographical boundary is used generically, no limitation is intended. Thus a political map is also referred to as a geographical boundary or spatial boundary, and all are intended to convey the same concept.

As discussed above, three options exists for determining boundaries. The first option is a pre-determined boundary. This is a situation where the method of the present disclosure receives an existing boundary. An example of this first option is shown in FIG. 1, where for example the boundary of the state of Indiana is provided. In this case, the boundary is taken as provided. The second option is based on convex hull. In this situation, for a general area, suppose one is interested in a 1, 10, 100, or 1000 square mile area, population of a species of interest (e.g., birds, persons belonging to a political affiliation, etc.) are plotted on an XY Cartesian coordinate system. The method then optionally finds an extreme position on the XY Cartesian coordinate system, e.g., a point nearest the Y-axis corresponding with the highest Y value. This point establishes the first point of the boundary. The method then draws a line to all other points from that initial point. A comparison is then made to all angles from that point. Suppose there are 3000 points on the graph, by identifying the first point 2999 connections can be made. Each connection is compared to a vertical line to measure angle therefor. The point with the smallest angle produces the next point of the boundary. This process is repeated until all points are accounted for and the boundary is closed. This is called convex hull approach. The third approach is concave hull approach. This method is similar to the previous method, except not only the angle of each point is taken into consideration, but also the distance from any one point to the other points are also taken into account. Therefore, any next point on the boundary is not simply based on the smallest angle, but also based on smallest distance from a prior point on the boundary. It should be noted that in both cases instead of smallest angle or smallest distance, other criteria can be used as well. For example, instead of smallest angle, the criterion may be the largest angle.

Once the geographical boundary is determined, thereafter, the method of the present disclosure includes determining regions of interests within the boundary. These regions are intended to divide the boundary into a plurality of segments each containing information about a parameter of interest. The dividing step of the method of the present disclosure is based on dividing the geographical boundary into a plurality of regions of interests, each region of interest being defined by a start point and an end point on the geographical boundary, wherein the end point associated with one region of interest coincides with a start point of a neighboring region of interest. It should be appreciated that according to the method of the present disclosure, there can be no region of interest that are completely internal to the boundary. In other words, each region of interest must include a segment having a start point and an endpoint on the boundary. Therefore, each region may include three or four vertices, two are defined by the start point and end point and the remainder vertex (vertices) defined by points internal to the boundary.

The method of the present disclosure is described with respect to an algorithm list in Table 1, provided below:

TABLE 1

Algorithm According to the present disclosure (continued on next page)

1: B ← Compute outline based on P (e.g. user defined or using an algorithm e.g. concave hull)
2: B' ← B + b where b is a small positive number. B' is the offset outline.

TABLE 1-continued

Algorithm According to the present
disclosure (continued on next page)

Figure 2C:
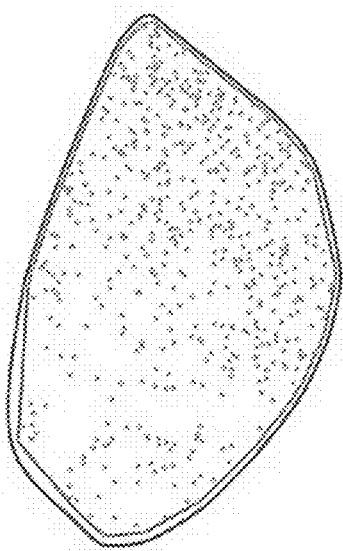
Figure 2B:
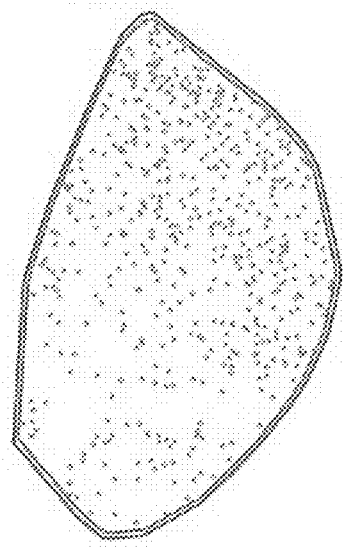
Figure 2A:
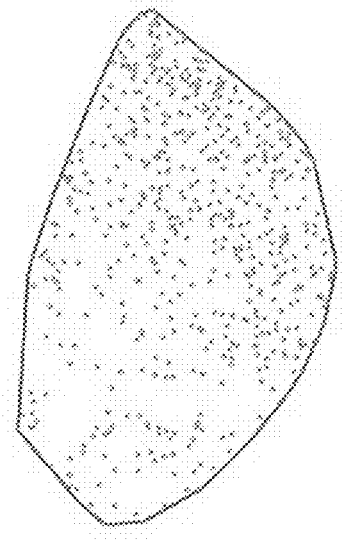

3: Use B' to generate a closed Bezier curve C using a curve fitting algorithm.
4: Divide C into n segments to get V, a set of divisor points and S, a set of segments.
5: W ← ∅
6: for i ← 0 to n − 1 do
7:    $v_i$ ← a point from V
8:    $v_{i+1}$ ← adjacent point of $v_i$. Note, $v_n$ is $v_0$.
9:    $c_i$ ← the inscribed circle inside C with respect to $v_i$
10:    $o_i$ ← the center of the circle $c_i$
11:    $r_i$ ← the radius of the circle.
12:    Define a polygon region $R_i$ through the points $(v_i, v_{i+1}, o_i, o_{i+1})$.
13:    $Sum_i$ ← the number of points that belong to P inside the region $R_i$, and $A_i$ ← the area of $R_i$.
14:    $d_i$ ← $Sum_i/A_i$ ( $d_i$ is the density).
15:    Append $d_i$ to W
16: end for
17: Set the sliding window as size 2x and apply weighted arithmetic mean (WAM calculation on all density outputs, using the area $A_i$ of every individual slice as weight factor for WAM. (x is suggested to be a divisor of n as an empirical number, e.g, if n is set as 3000, x should be 75, 150, 300, or 500)
18: for i ← 1 to n do
19:    $w'_i \leftarrow \Sigma_{k=i-x}^{i+x}(w_k \times A_k)/\Sigma_{k=i-x}^{i+x}A_k, k \in [i-x, i+x]$
20:    $w'_i = w'_i \times c$ ← constant scalar to scale the number up or down. Assign $w'_i$ to the stroke width of the segment $s_i \in S$.
21: end for
22: Connect all segments to be the curve C'
23: Clip out the outer half of C' using the original Bezier C
24: return C' as the Phoenixmap for P The algorithm shown in Table 1 in step 1 starts by determining whether the boundary of the area of interest is provided apriori, or if not which of the two available techniques (convex hull or concave hull, discussed above to use). The boundary out of step 1 is referred to as B. Next, in step 2 the algorithm increases the boundary outward by a small positive number, e.g., B'=B+b'. Next, in step 3, the algorithm uses a smoothing function to smooth out the modified boundary B' into boundary C. While a closed Bezier curve is referred to in Table 1 for this step, it should be appreciated that other outcomes are possible, e.g., one from a moving average filter, as is known to a person having ordinary skill in the art. Referring to FIGS. 2a-2c, operations of steps 1-3 on an example boundary are provided. In particular, FIG. 2a provides the boundary B with various population therein. FIG. 2b provides the modified boundary B' with a small offset b. FIG. 2c provides the smoothing operation on the modified boundary B' into boundary C.

Figure 3:
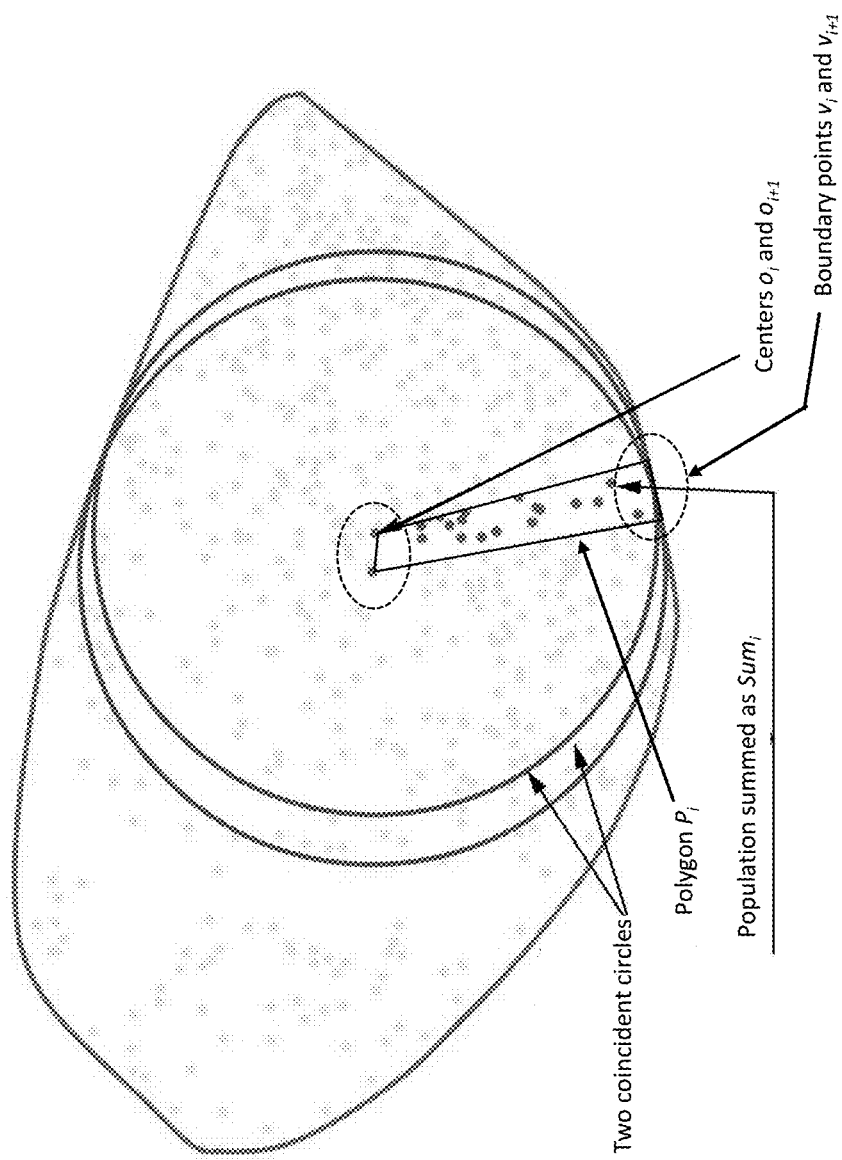
FIG. 3 is a schematic of choosing circles and line segments in determining a polygon representing a region of interest, according to the present disclosure.

Next, according to steps 6 to 16, the algorithm of Table 1 divides the boundary C into n segments. Each segment is defined by two boundary points on the boundary C: $v_i$ and $v_{i+1}$, wherein $v_n=v_0$. For each boundary point, a circle with center location at $o_i$ and radius $r_i$ is thus determined so that it each is coincident (tangent) at the boundary points $v_i$ and $v_{i+1}$. With the two circles defined, the algorithm of Table 1 then generates a polygon based on $v_i$ and $v_{i+1}$ and of and $o_{i+1}$. Next, the area of the polygon is determined as Ai and the population within Ai is determined and summed as $Sum_i$, thereafter density $d_i$ is determined by dividing $Sum_i$ by area $A_i$. Next, $d_i$ is added to a previously defined array W. These operations (step 6-16) are shown in FIG. 3. In particular, in FIG. 3 two boundary points $v_i$ and $v_{i+1}$ are shown which are used to generate two circles defined by two centers $o_i$ and $o_{i+1}$, thereby generating a polygon $P_i$ with an area $A_i$. Population within the polygon $P_i$ is summed as $Sum_i$. A density $d_i$ is defined as $Sum_i/A_i$.

Figure 4:
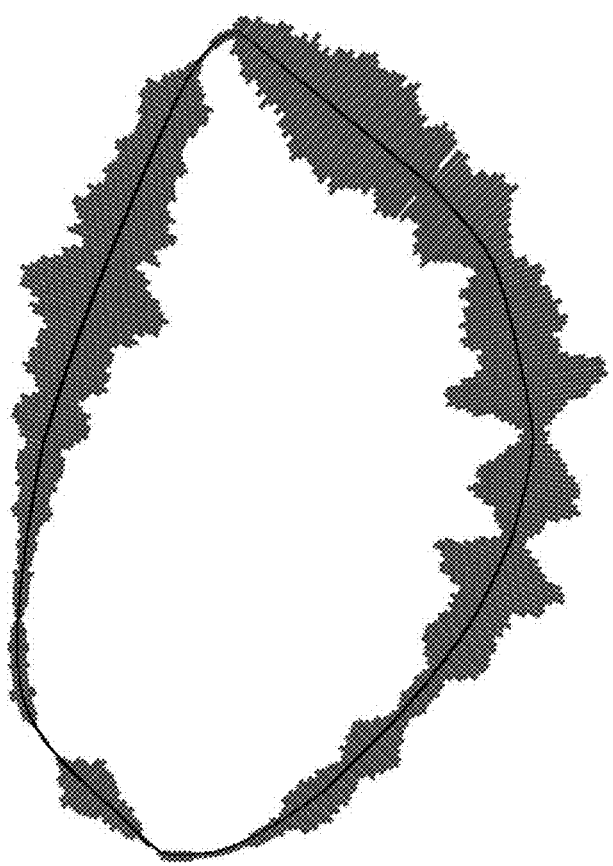
FIG. 4 is a graph of line thicknesses about a boundary showing mirror image of the thickness about the boundary.

Line width (thickness) can be used to represent the density of points enclosed by the boundary. Repeating the density calculation described above for each slice to generate a list of densities, the densities are then appended to the width (W) of each corresponding segment (Step 15 of the algorithm in Table 1). With the large number of short segments along the curve, the width (thickness) of the segments varies greatly, since distribution will not be uniform in the real world. Since the varying densities and thus the varying line thicknesses are not visually appealing, the segments are smoothed into a continuous curve. Referring to FIG. 4, raw variation of line thickness is shown to show various populations.

To convert the discrete graph to a continuous smooth curve, a sliding window mechanism is applied to smooth the zigzag segments. This involves computing a smoothed, weighted width w for $w_i$ of W. Another empirical number is also introduced for the size of the window, denoted as x. Based on our experiments with different values, we suggest that x should equal between one-sixth and one-twentieth of the total number of segments n. For instance, if n is 3000, then 150, 300, or 500 would be preferred values for x. If x is too large, e.g. more than one-tenth of n, the curve will be very smooth but may lose detail. If x is small, e.g. less than one-twentieth of n, the curve carries a lot of detail but may look rugged. When computing, each segment carries a weight of its corresponding area $A_i$. Some segments correspond to large areas, while others correspond to small areas. Given any $w_i \in W$, we compute the sum of the weighted width $w_k \times A_k$ within 2x size from $w_{i-x}$ to $w_{i+x}$. In the end, we compute the weighted average of $w_i$ and replace $w_i$ in the width list. Alternatively, a smaller window, e.g., less than one-twentieth of n can be used in cascaded manner (i.e., a recursive manner). After this transformation, the width (thickness) of neighboring segments is averaged out to convert the discrete weighted segment curve into a continuous weighted curve. After the sliding window treatment, the new smooth curve is denoted as C'. These operations are shown in Table 1 as steps 18-21. In particular, for each segment i=1 to n, a window size (2x) is defined and a new weighted density is determined by $$w'_i = \Sigma_{k=i-x}^{i=x}(W_k \times A_k)/\Sigma_{k=i-x}^{i=x}A_k, k \in [i-x, i+x] \qquad (1)$$

Figure 5D:
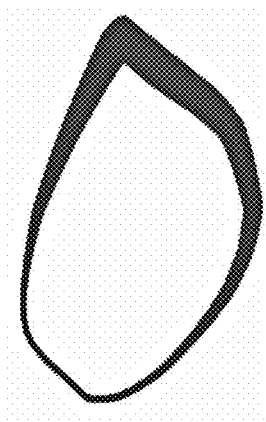
Figure 5C:
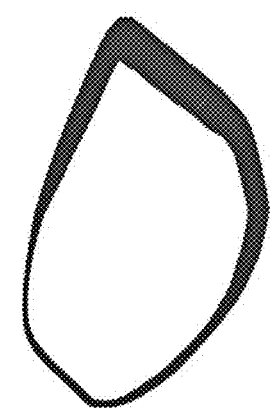
Figure 5B:
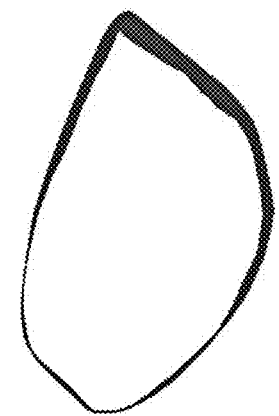
Figure 5A:
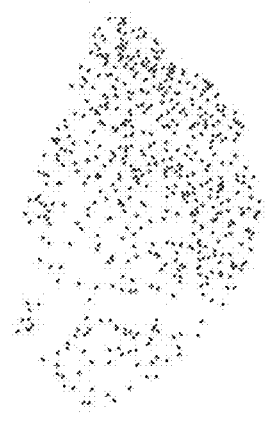

Optionally, $w_i'$ can be upscaled by a constant scalar. Thereafter all the segments that are now smooth are connected together. Effects of these operations and varying sizes for the sliding window is shown in FIGS. 5a-5d. In particular, FIG. 5a shows raw population. FIG. 5b shows Segments=3000 and Sliding Window=70. FIG. 5c shows Segments=3000 and Sliding Window=150. FIG. 5d shows Segments=3000 and sliding window=300.

Figure 5E:
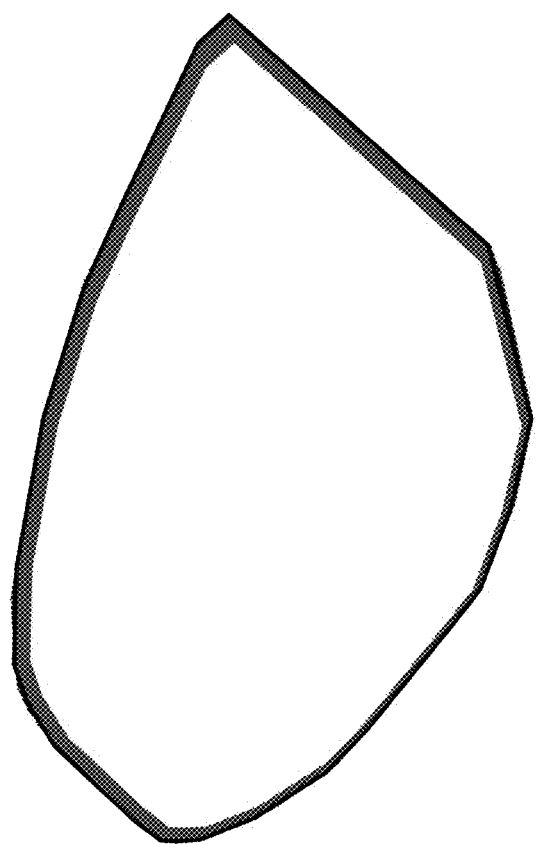
FIG. 5e shows clipping of the mirror imaged data on the outside of the boundary depicting population on the inside of the boundary.
Figures 1, 8:
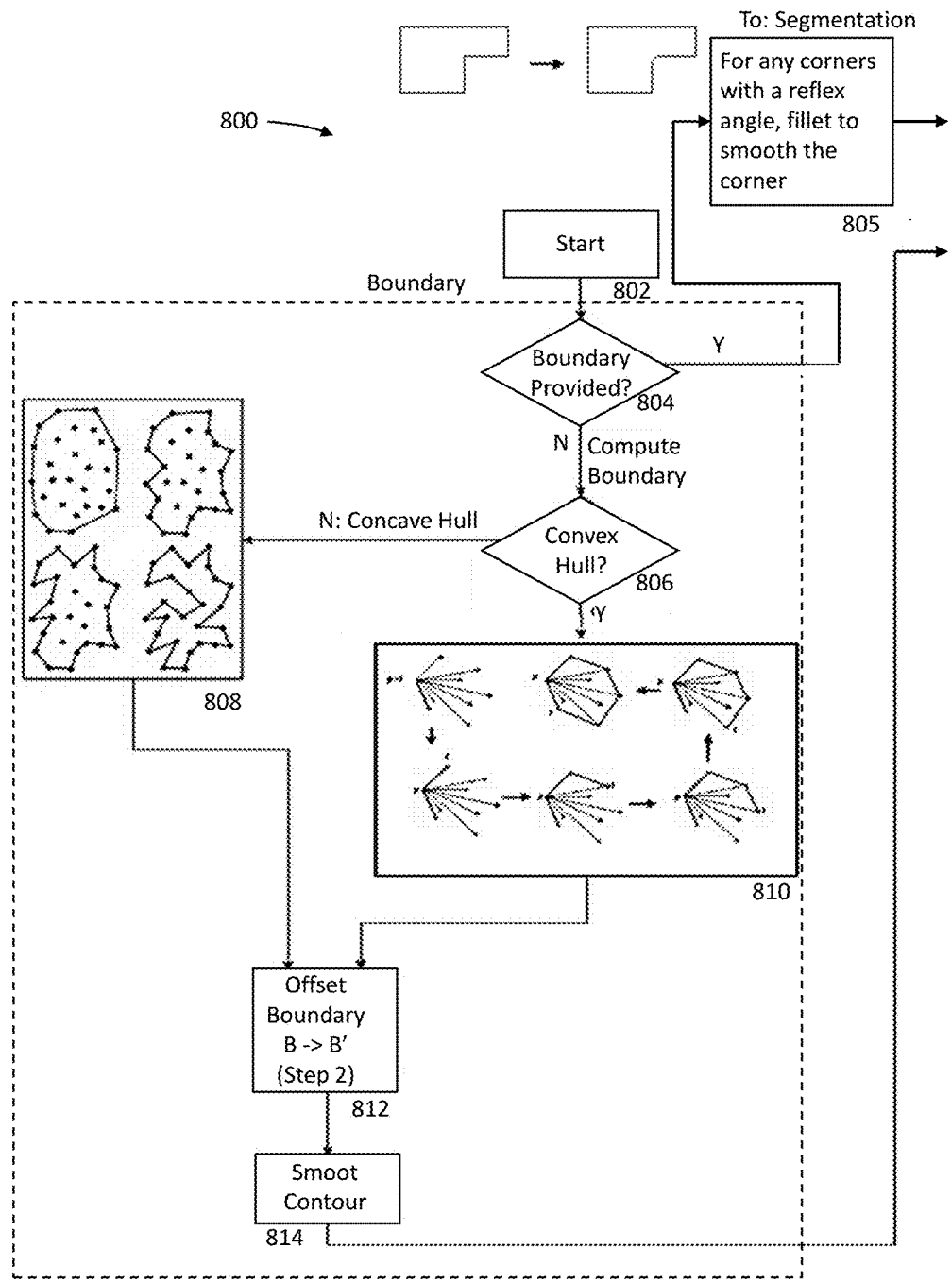
Figures 2, 8:
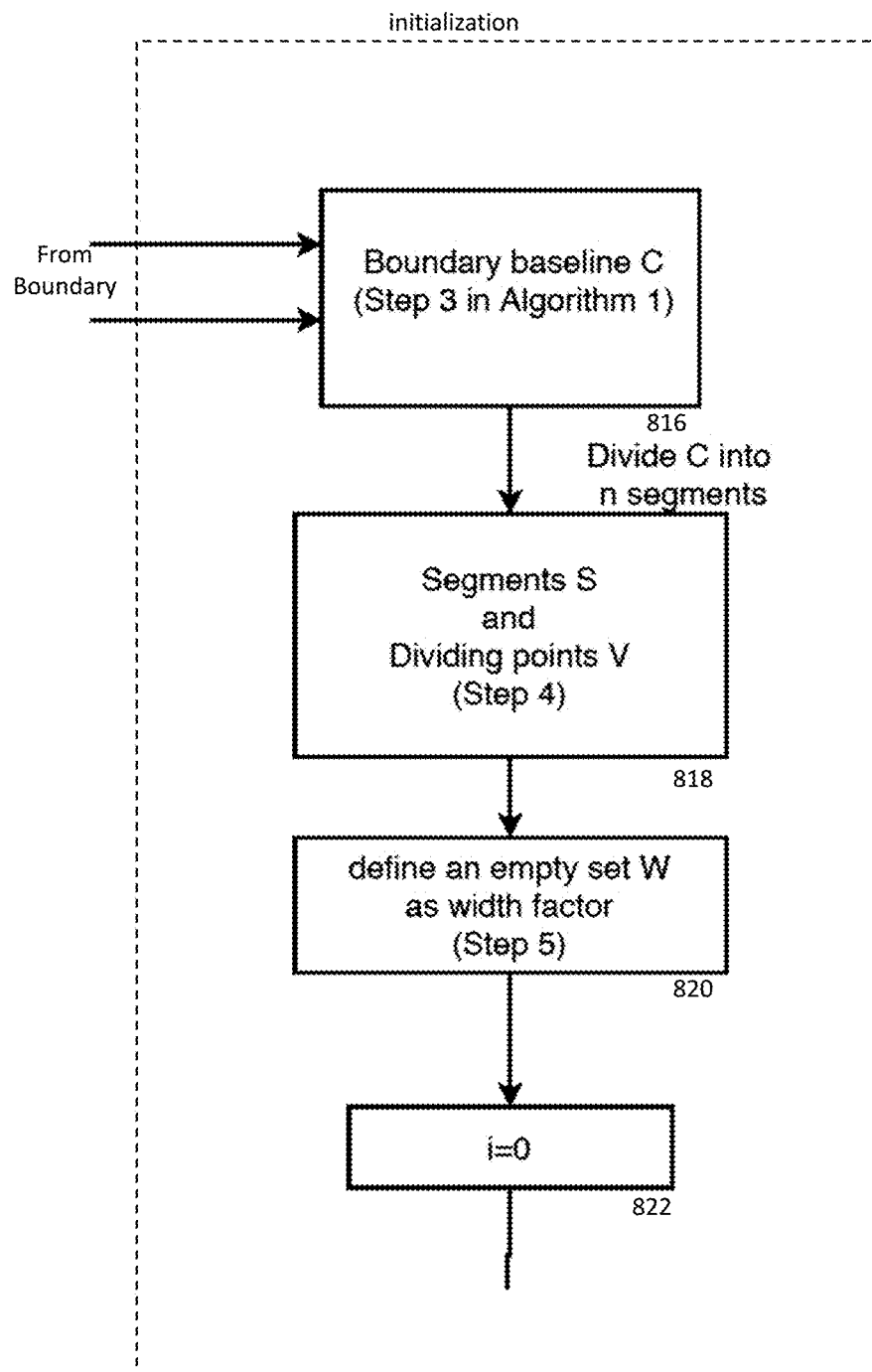
Figures 3, 8:
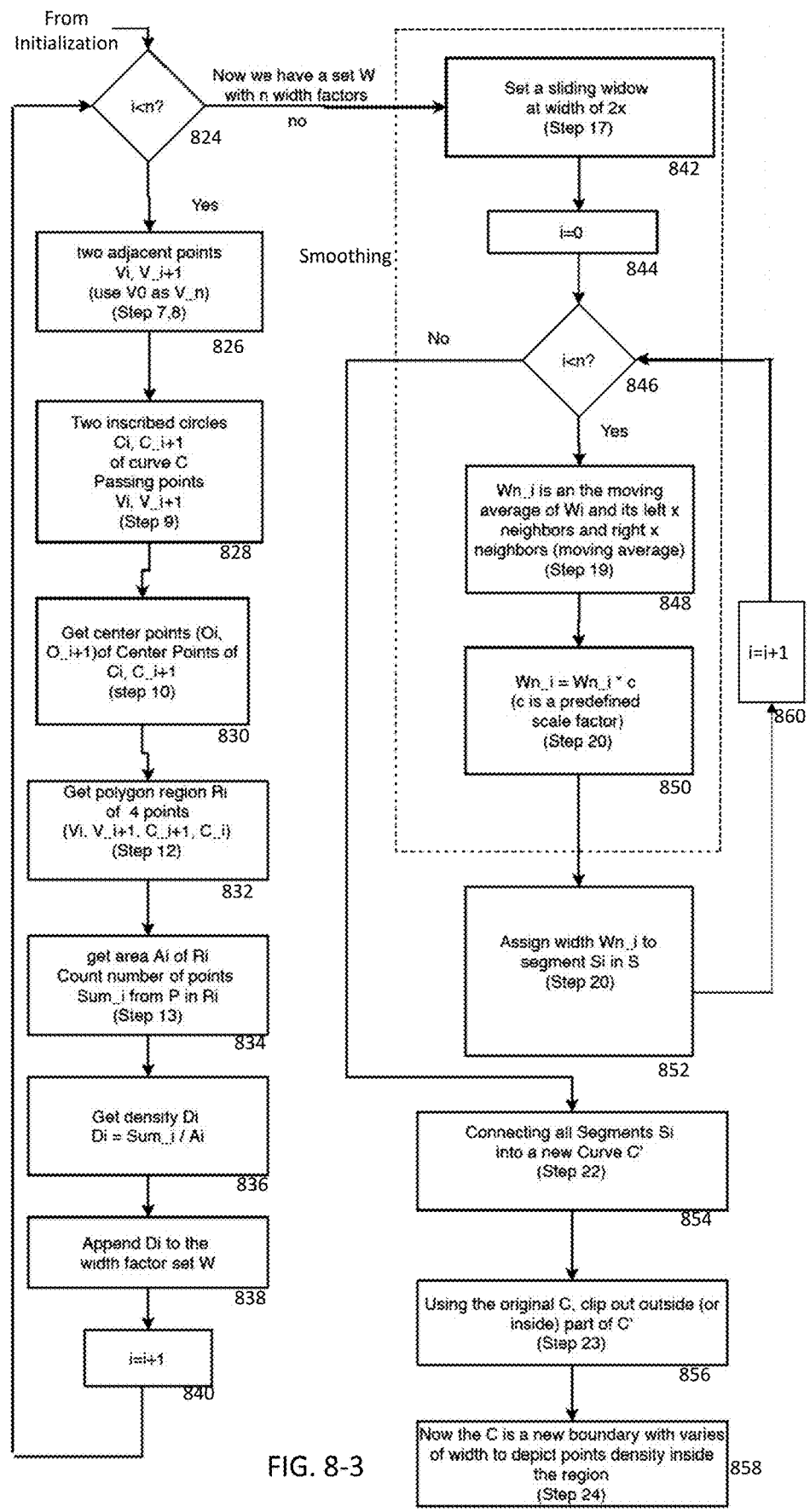
Figures 1, 9:
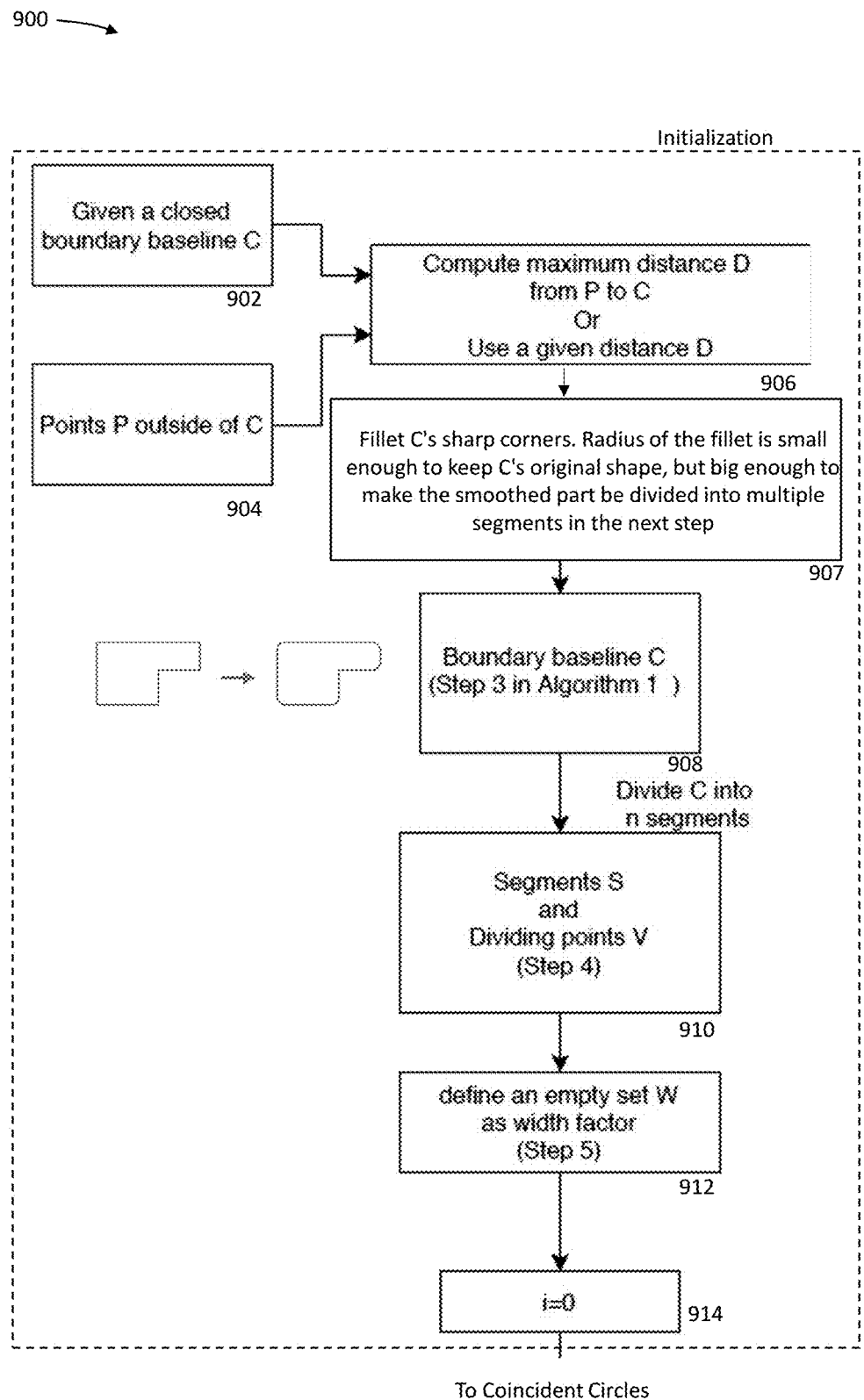
Figures 2, 9:
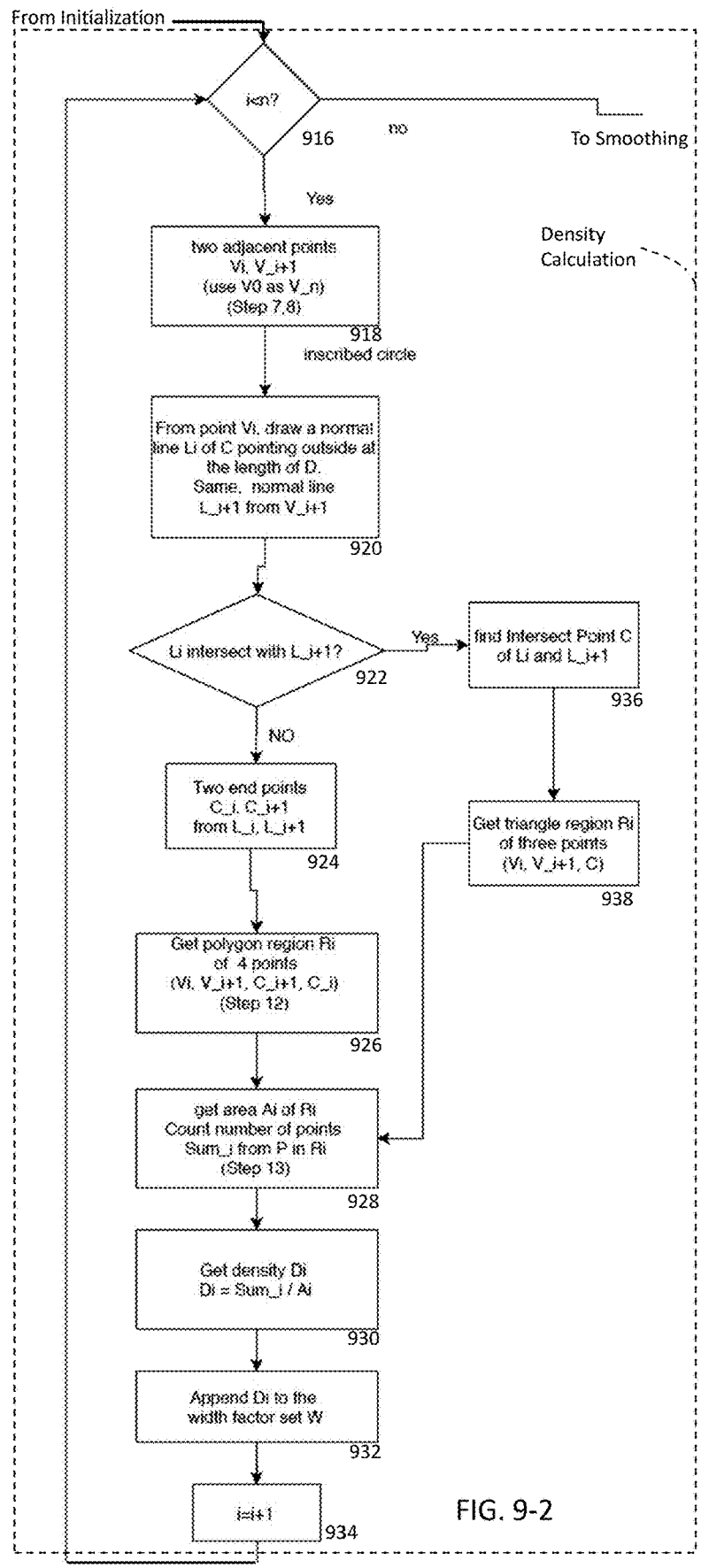
Figures 3, 9:
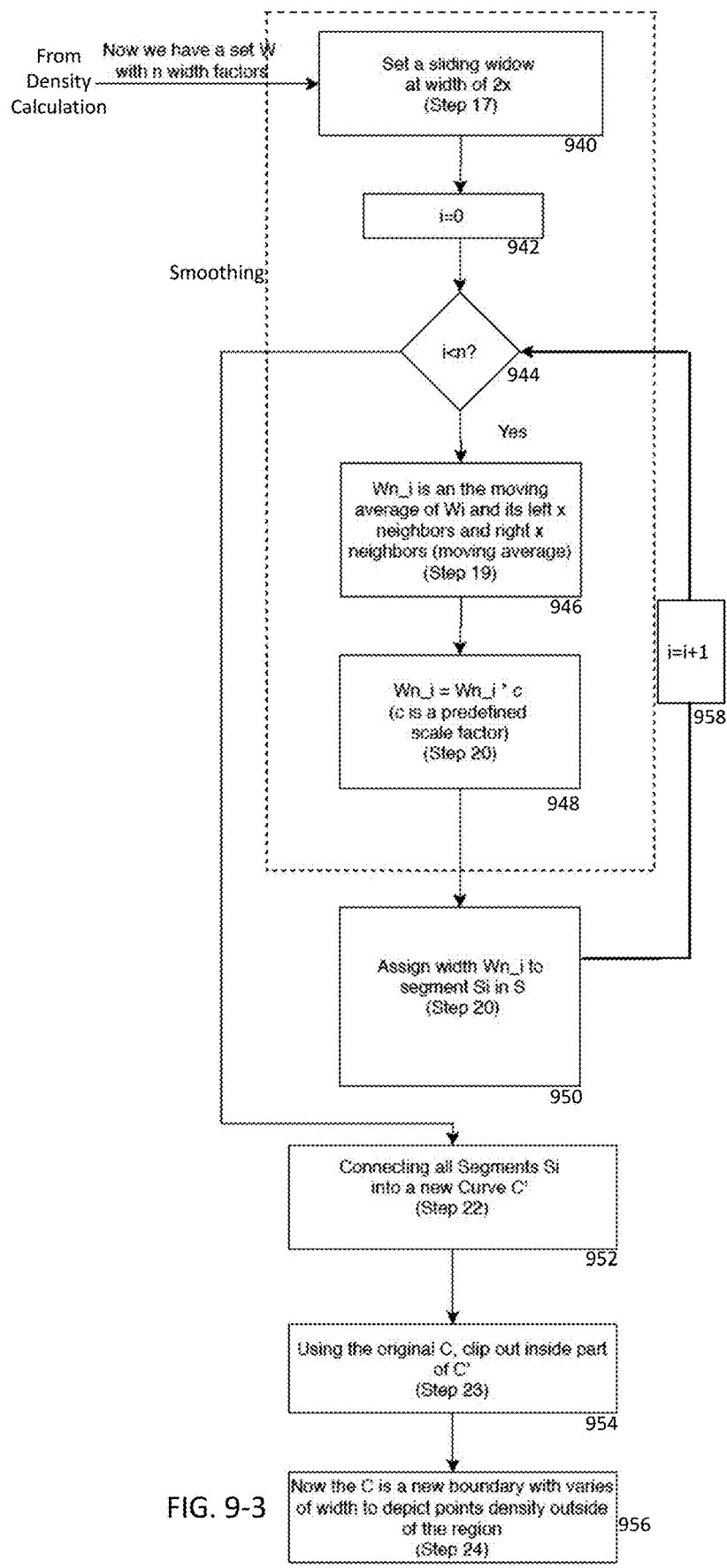

The last step in the algorithm of Table 1 is an optional step. This step is directed to removing the mirror-image version of the line thickness across the boundary C' and only retaining the inner portion. This operation is shown with respect to FIG. 5e. The purpose for this optional modification is to provide a frame of reference for internal population density wherein the outside portion of the thickness is removed vs. outside population density, wherein similarly, the inside portion of the thickness is removed. Doing so allows one to distinguish between inside densities and outside densities. In other words, if the thicknesses are shown as inside the boundary C', those correlate to inside densities, while thicknesses shown on the outside of the boundary C' are outside densities. FIG. 5e shows inside densities.

To provide even more information, a legend is provided according to the present disclosure to further represent the major distribution characteristics inside the region and to help on quantitative estimation. FIGS. 6a-6c demonstrates the generic distribution trends for three different scenarios: normal distribution (FIG. 6a), in which objects are more dense toward the center of the region; uniform distribution (FIG. 6b), in which objects are scattered uniformly in the range; and close-to-edge distribution (FIG. 6c), in which objects are more dense toward the edge. The users can quickly view the supplementary legend box and see the estimated gradient density distribution inside the outline. In each legend, the top of the box represents the density close to the approximate geometric center, while the bottom shows the density close to the edge.

To compute the density legend, for each segment slice in FIG. 3, from the center to the edge, each slice is divided into many (e.g. 100, as in the example) sub-sections. Average density of each sub-section is then computed from each of the slices. Thus, an average distribution is obtained which is mapped into a box; a short line is also introduced to quantify the thickness of the outline. With the text at the bottom of the legend, the user can easily see how many points correspond to the specific thicknesses shown in the graph, and understand the characteristic of the distribution. In the text description, P stands for points and SQU is square units. The unit should be defined based on the application, e.g. in inches, feet, meters, or kilometers. In FIG. 6, only one bar legend is provided for demonstration purposes, however, it should understood that a series of legends with different thicknesses can be provided to help the reader better estimate densities.

It is possible that two parameters of interest result in similar thicknesses of a boundary of an area of interest. In such a situation, when multiple distributions share the same outline, users can adjust color or transparency, or add patterns to visualize and compare densities within the same range. Referring to FIG. 7, an example of use of color and transparency is shown.

To better demonstrate the method of the present disclosure, reference is made to FIGS. 8-1, 8-2, 8-3 (split over three sheets provided as FIG. 8-1, FIG. 8-2, and FIG. 8-3). Referring to FIGS. 8-1, 8-2, 8-3, a method 800 is provided in the form of a flowchart is provided to show the steps in developing the boundary and the regions of interest for points inside the boundary. The method 800 begins with the start block 802. In the query block 804, the method 800 inquires about whether a boundary is provided apriori. If so the method 800 proceed to block 805 where sharp corners of the boundary are first treated. Thus, for any corners with a reflex angle, the method 800 provides a fillet to smooth the corner. The radius of fillet is sufficiently small such that the fillet maintains the original shape, however sufficiently large to make the smoothed section contain multiple segments in step 4 of the algorithm in Table 1. After the fillet operation, the method 800 proceeds to the segmentation. If the answer to query 804 is no, then the method 800 inquires about which of two boundary determination implementations discussed herein (i.e., convex hull or concave hall) is of interest. In query block 806, the question is whether convex hull is to be implemented. If no, the method 800 proceeds to block 808 where concave hull. If yes, the method 800 proceeds to block 810 where convex hull is implemented. These steps (blocks 804-810) refer to step 1 of the algorithm provided in Table 1. Outputs of either blocks 808 or 810 is then provided to block 812, where an offset is provided, according to also step 2 of the algorithm of Table 1. Next the method proceeds to block 814, where the contour is smoothed out, which correlates to step 3 of the algorithm in Table 1. The output of query block 804 or block 814 are then passed on to the next page of FIG. 8-2 to segmentation.

Block 816 is the return of blocks 804 or 814. Next, the method 800 proceeds to block 818 which divides the boundary into a number of points (n), also in accordance with step 4 of the algorithm of Table 1. Next in preparation for density calculations, the method proceeds to blocks 820 and 822 where a set W and counter i are initialized (see step 5 of the algorithm in Table 1).

The method 800 then proceeds to a loop which begins on block 824 and which continues through block 840. Block 824 inquires if the counter i is less than n (see step 6 of the algorithm in Table 1); if yes, the method proceeds to block 826. If no, the method 800 moves to block 824, discussed below. In block 826, two adjacent points are chosen based on the counter i (see steps 7-8 of the algorithm in Table 1). Next, the method 800 proceeds to blocks 828 and 830 in which two inscribed circles and their centers $c_i$ and $c_{i+1}$ are determined (see steps 9-11 of the algorithm in Table 1). Next, the method 800 proceeds to block 832 where a polygon $P_i$ is determined (see step 12 of the algorithm in Table 1). Next, the method 800 proceeds to blocks 834 and 836 where the area and density of each polygon is determined (see steps 13-14 of the algorithm in Table 1). The method 800 then proceeds to blocks 838 and 840 where the calculated density is added to the set W and the counter is incremented (see steps 15-16 of the algorithm in Table 1).

Once the loop ends (i.e., counter i reaches the endpoint n), the method 800 proceeds to block 842 where a sliding window is identified based on 2× where x is a divisor of n (see step 17 of the algorithm in Table 1). Next the method 800 proceeds to a new loop beginning with block 844 (initialization of counter i) and which proceeds to block 852. In this new loop, for every count of the counter, the moving average is applied until the counter has expired (see steps 18-21 of the algorithm in Table 1). Next, the method 800 proceeds to blocks 854-858 in which all new segments (post application of moving average filter) are connected (see steps 22-24 of the algorithm in Table 1). It should be noted that according to the method 800, in block 856, an optional clipping operation occurs for the mirror image of the thicknesses positioned outside of the boundary C'. As will be seen in FIGS. 9-1, 9-2, 9-3 (method discussed next for outside densities), the operation in block 856 occurs for densities inside the boundary C'. This clipping operation is elucidated in FIG. 5e.

Referring to FIGS. 9-1, 9-2, 9-3, a method 900 is provided in the form of a flowchart is provided to show the steps in developing the boundary and the regions of interest for points outside the boundary. The method 900 includes blocks 902-958 which are parallel to blocks 802-860 of method 800 shown in FIGS. 8-1, 8-2, 8-3. Given the similarities between these two methods, only differences are discussed herein. In block 902 and 904 a boundary is received and a set of points P outside the boundary are identified. In block 906, maximum distance from points of the pints in the set P to the boundary is identified, or alternatively a distance D is provided apriori. In Block 907, any sharp corners are initially smoothed (not present is the method 800 of FIGS. 8-1, 8-2, 8-3). The finalized boundary C is thus generated in Block 908 (see step 3 in the algorithm of Table 1). The next few blocks are the same or similar as those shown in FIGS. 8-1, 8-2, 8-3 until block 920 in which instead of drawing perpendicular lines inward into the boundary C, perpendicular lines are drawn outward. After block 920, in query block 922 the method 900 ascertains whether the two lines intersect. This is a situation where the two perpendicular lines due to the shape of the boundary result in an intersection somewhere outside the boundary. If so, the method 900 proceeds to block 936 where the intersection is determined and then to block 938 where a region is designated based on the two points on the boundary, the boundary therebetween, and the intersect point. Otherwise, the method 900 proceeds to block 924 where similar to method 800 regions are defined with the difference being that the regions are disposed outside the boundary and not inside. In this case, instead of circle formed that are tangent to the boundary at each point (see FIG. 8-3, block 828), two perpendicular lines are formed each on a respective tangent line, each perpendicular line have a dimension of D, the parameter identified in block 906. Therefore, the beginning of each perpendicular line is the corresponding point on the boundary and the end point is the distance D away. The region of interest thus is formed as a polygon between the points on the boundary and the two endpoints on the perpendicular lines as provided in Block 926 of FIG. 9-2. The remainder of the method 900 is the same or similar as that of method 800. One last difference is the clipping discussion. As discussed above, block 954 is directed to the optional step of clipping the line thicknesses on the inside of the boundary C'.

Figure 10:
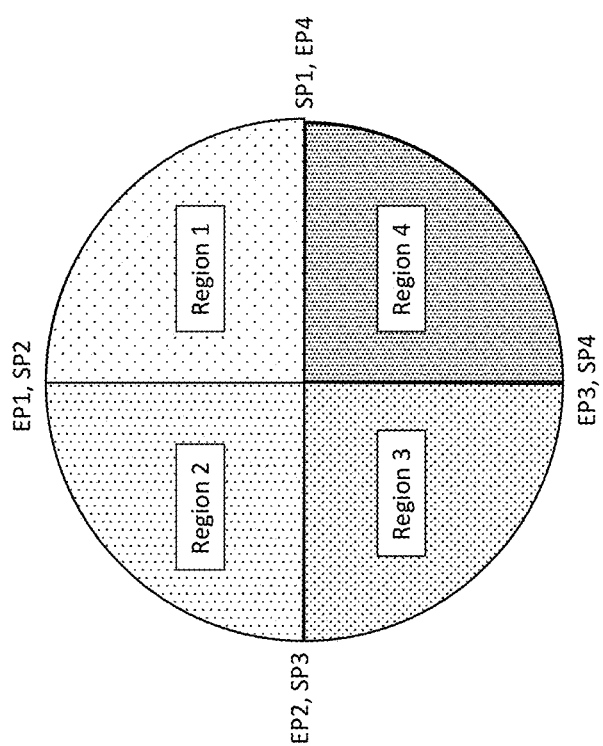
FIG. 10 is a schematic of a boundary where the regions of interest are provided as predefined regions.

According to another embodiment, the regions of interest may be provided as predefined regions. For example, if the boundary is a complete circle, the regions of interests may be four quadrants or many more slices for a finer granularity. The first region of interest may be the first quadrant which has a start point at 0 degree and an end point at 90 degrees. This region of interest then has three vertices: zero degrees, ninety degrees and the center of the circle. The second region of interest may be the second quadrant which has a start point at 90 degree and an end point at 180 degrees. This region of interest then has three vertices: 90 degrees, 180 degrees and the center of the circle. The third region of interest may be the third quadrant which has a start point at 180 degrees and an end point at 270 degrees. This region of interest then has three vertices: 180 degrees, 270 degrees and the center of the circle. Finally, the fourth region of interest may be the fourth quadrant which has a start point at 270 degrees and an end point at 360 or 0 degrees. This region of interest then has three vertices: 270 degrees, 0 degrees and the center of the circle. Referring to FIG. 10, these regions of interests are depicted.

Alternatively, the regions of interest may be calculated based on an algorithm according to the present disclosure, as discussed above.

Figure 11A:
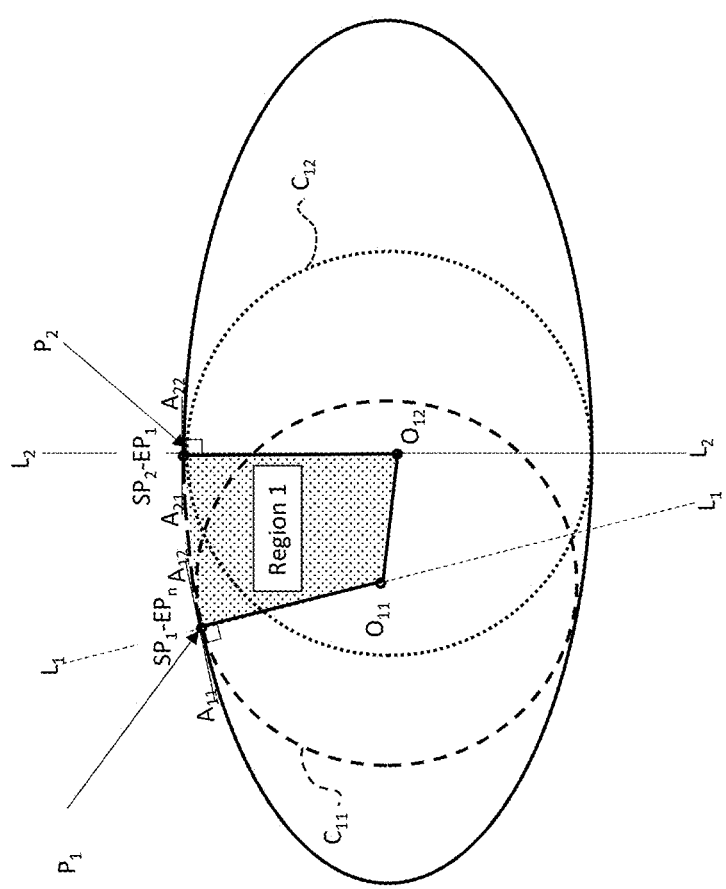
FIG. 11a is a schematic of how a region of interest is determined when the region of interest is inwardly disposed within the boundary according to the present disclosure.

To better elucidate the operations of the above algorithm provided in Table 1 or shown in FIGS. 8-1, 8-2, 8-3, reference is made to FIG. 11a for concentrations on the inside of the boundary. The geographical boundary is divided into a plurality of segments. These segments may be equi-length or according to another embodiment segments of varying lengths (not discussed in the algorithm but within the scope of the present disclosure). As with predefined regions of interests, each segment on the boundary is defined by a start point and an endpoint. Shown in FIG. 11a are two such points $P_1$ and $P_2$. These two points define two lines $A_{11}$ to $A_{12}$ and $A_{21}$ to $A_{22}$. Pu represents start point $SP_1$ and end point from the last segment (not shown) $EP_n$. A first line is drawn from the start point $SP_1$ that is perpendicular to the curvature of the boundary at $SP_1$. A first circle (CO having a center at $O_1$ with the minimum possible first diameter is then drawn with its center on this first perpendicular line. The first diameter of the first circle is determined such that the first circle not only touches the boundary at the start point but also touches another point on the boundary. However, it should be noted that in rare cases, one such circle may touch multiple points on the boundary. But the boundary will never pass through the circle, only tangent to the circle. Again the first circle is designed to have the minimum possible diameter with the aforementioned conditions of touching the two points.

The above procedure is repeated for the second end point ($P_2$). A second line $A_{21}$ to $A_{22}$ is drawn from the endpoint that is perpendicular to the curvature of the boundary at the endpoint. A second circle ($C_2$) having a center at $O_2$ with the minimum possible second diameter is then drawn with its center on the second perpendicular line. The second diameter of the second circle is determined such that the second circle not only touches the boundary at the endpoint but also touches another point on the boundary. Again the second circle is designed to have the minimum possible diameter with the aforementioned conditions of touching the two points. As stated above, in rare cases, one such circle may touch multiple points on the boundary. But the boundary will never pass through the circle, only tangent to the circle.

The region of interest for the aforementioned start point and end point is thus defined as a regions having four vertices: the start point ($SP_1$), the end point ($EP_1$), the first center ($O_1$), and the second center ($O_2$). If the boundary is a perfect circle, $O_1$ and $O_2$ would occupy the same point. It should be appreciated that in certain cases, e.g., the situation shown in FIG. 2, the third and fourth vertices can be the same point.

The aforementioned process is repeated for all the segments of the boundary, resulting in non-overlapping regions of interests. It should also be appreciated that the method of the present disclosure requires a boundary free of self-intersections.

Once the regions of interests are defined, then for each region of interest a parameter of interest is calculated. For example, density per area may be the parameter of interest. The calculation of the parameter of interest may be by integration discrete values or continuous values. For example, concentration of individuals associated with one political party may be the parameter of interest. Integrating the number of identified individuals associated with a political party and dividing that integrated value by area of the associated region of interest can provide a single number associated with that density. Based on the calculated number associated with each region of interest, the associated segment is drawn using a line thickness proportional to the calculated number.

Figure 11B:
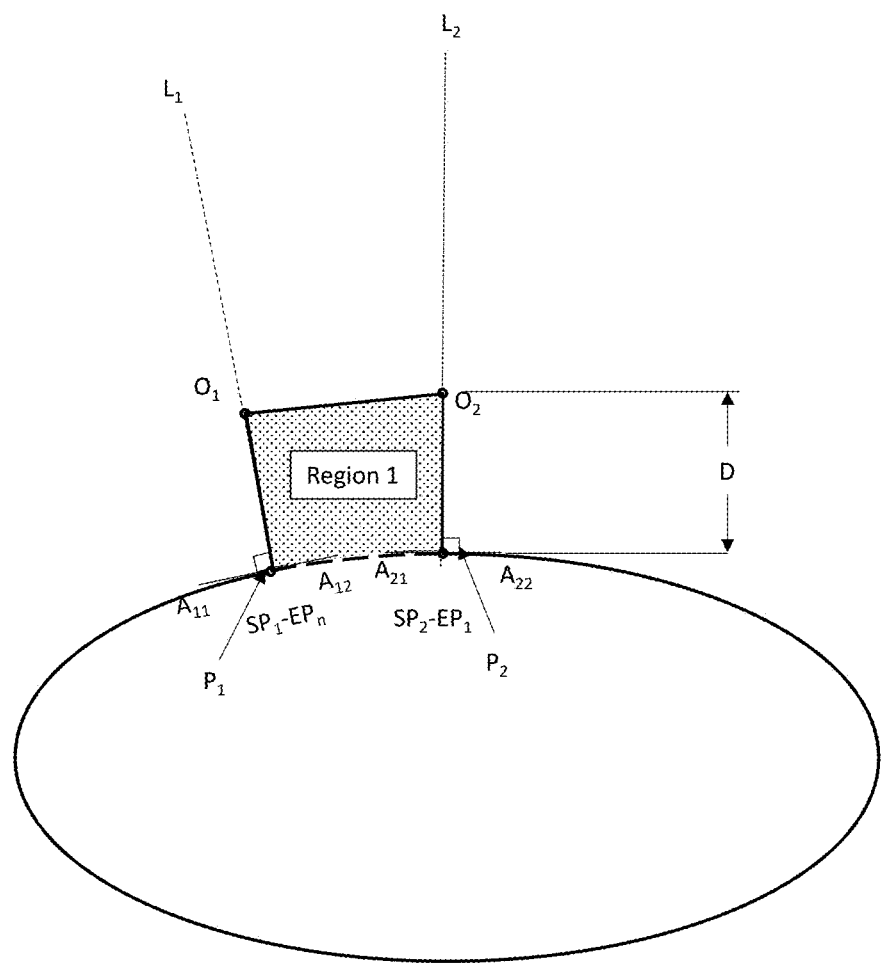
FIG. 11b is a schematic of how a region of interest is determined when the region of interest is outwardly disposed away from the boundary, according to the present disclosure.

With reference to FIG. 11b, the same configuration of FIG. 11a is shown, however, this time with points of interest (i.e., densities) outside the boundary. Instead of drawing circles as the case was with FIG. 11a, two perpendicular lines formed against the boundary. These lines are drawn perpendicular to the tangent lines each formed on points $P_1$ and $P_2$ (representing $A_{11}$-$A_{12}$ and $A_{21}$-$A_{22}$; and $SP_1$, $EP_n$, $SP_2$, and $EP_1$, as described with reference to FIG. 11a) on the boundary. The perpendicular points have their start points at $P_i$ ($SP_1$-$EP_n$) and $P_2$ ($SP_2$-$EP_1$) with their end points at $O_1$ and $O_2$ (also referred to herein as the first vertex and the second vertex), each with a distance D away, which as explained with respect to FIGS. 9-1, 9-2, 9-3 is either provided apriori or determined based on the farthest point. The region of interest is the polygon between $P_i$, $P_2$, $O_1$, and $O_2$.

Figure 12:
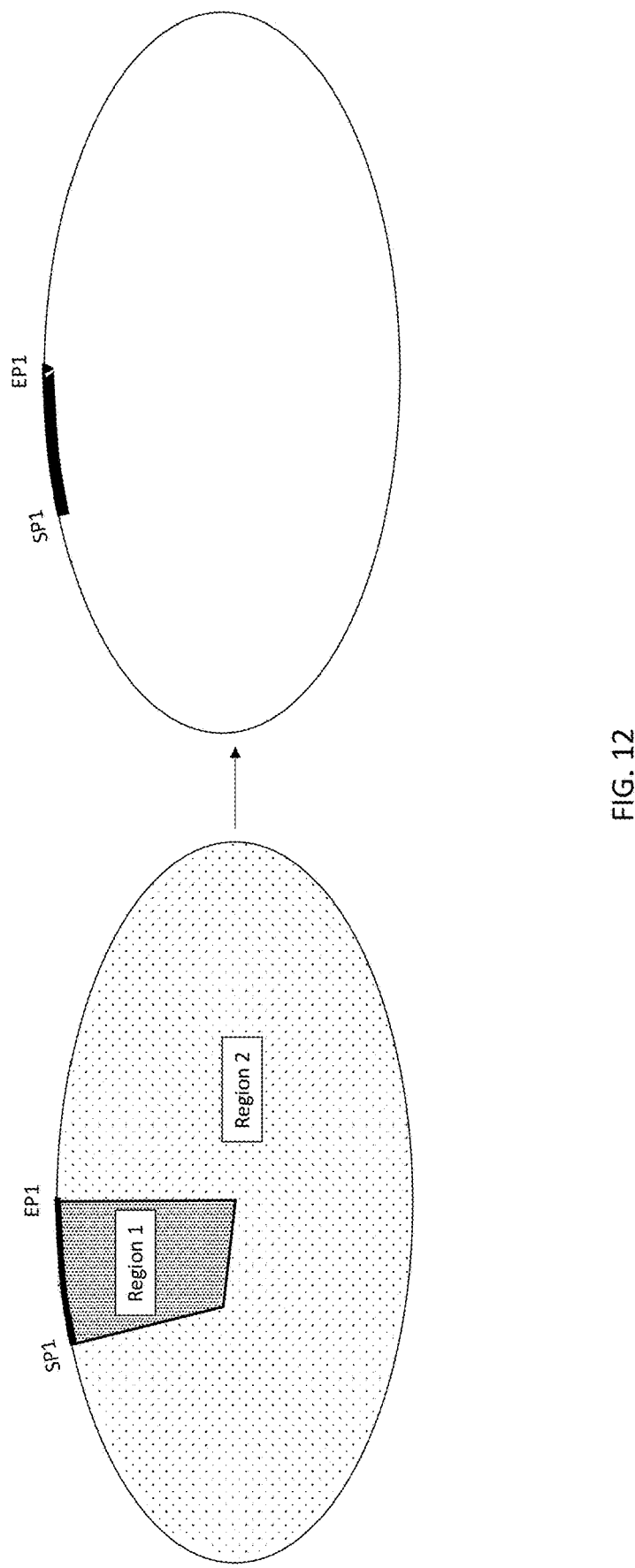
FIG. 12 is a simple schematic showing how population difference manifests into line thicknesses on the boundary, according to the present disclosure.

Referring to FIG. 12, the ellipse of FIG. 11a is redrawn with Region 1 highlighted having a certain population density with the remainder of the ellipse having a different population (shown in the one panel of FIG. 12 with densities of regions). The segment associated with Region 1 is thus thickened proportional to the density of Region 1. In the panel shown without the densities, and with only one segment having an elucidated line thickness. FIG. 12 provides a considerable amount of data compression using mapping visualization without overcrowding the visual presentation of the data.

It should be appreciated that the line thickness is inward towards the interior of the boundary. However, as described with respect to FIG. 5e, for outside populations, the line thickness would be disposed on the outside of the line. Thus no part of the line thickness exceeds the boundary to avoid confusion with another neighboring boundary.

In addition, the line thickness between each segment and the next are smoothed out using a smoothing function. An example of such a smoothing function is a moving average (e.g., a three point, a five point, or much higher, e.g., 101 points). To further smooth the transition, a fitting algorithm might be applied to turn the transitioning segments into continuous smooth curve Those having ordinary skill in the art will recognize that numerous modifications can be made to the specific implementations described above. The implementations should not be limited to the particular limitations described. Other implementations may be possible.

The invention claimed is:

1. A mapping method for identifying density of one or more parameters of interest positioned within a boundary, comprising:
    determining at least one geographical boundary about a geographical location of interest, the at least one geographical boundary is free of any self-intersections;
    dividing the at least one geographical boundary into a plurality of regions of interests, each region of interest is defined by a start point and an end point on the at least one geographical boundary, wherein the end point associated with one region of interest coincides with a start point of a neighboring region of interest wherein the region of interest falls within the at least one geographical boundary, wherein dividing the at least one geographical boundary is based on:
    for each of the segments of the plurality:
        providing a first tangent line to the at least one boundary at the start point and a second tangent line to the at least one boundary at the end point
        providing a first circle from a first center disposed on a first perpendicular line extended inwardly from the first tangent line such that the first circle is tangent against the at least one geographical boundary at the start point and also tangent against the at least one geographical boundary at a first point with the first circle having a minimum length first diameter;
        providing a second circle from a second center disposed on a second perpendicular line extended inwardly from the second tangent line such that the second circle is tangent against the at least one geographical boundary at the endpoint and also tangent against the at least one geographical boundary at a second point with the second circle having a minimum length second diameter; and
        defining the region of interest for the start point and the end point formed by a polygon with four vertices consisting of the start point, the end point, the first center, and the second center;
    for each of the plurality of regions of interest:
        calculating at least one parameter of interest within the region of interest; and
        graphically presenting a segment between the start point and the end point on the at least one geographical boundary with a line thickness proportional to the calculation results.

2. The method of claim 1, wherein the step of dividing the at least one geographical boundary is based on a predetermined division of the at least one geographical boundary into the plurality of regions of interests.

3. The method of claim 1, wherein the step of calculating the at least one parameter of interest is based on integration.

4. The method of claim 1, further comprising:
    smoothing transitions from one segment of the plurality of regions of interest to another.

5. The method of claim 4, wherein the smoothing is based on a moving average.

6. The method of claim 1, the step of determining at least one geographical boundary is based on i) a predetermined boundary; ii) convex hull; or iii) concave hull.

7. The method of claim 1, wherein the line thickness is based on a thickness scale.

8. The method of claim 1, wherein the thickness of each segment is inward pointing towards the interior of the at least one geographical boundary.

9. The method of claim 8, wherein a curve fitting function is applied to transitions between segments of varying thicknesses.

10. A mapping method for identifying density of one or more parameters of interest positioned outside a boundary, comprising:
    receiving at least one predetermined geographical boundary about a geographical location of interest, the at least one geographical boundary is free of any self-intersections;
    dividing the at least one geographical boundary into a plurality of regions of interests, each region of interest is defined by a start point and an end point on the at least one geographical boundary, wherein the end point associated with one region of interest coincides with a start point of a neighboring region of interest, wherein the region of interest falls outside the at least one geographical boundary, wherein dividing the at least one geographical boundary is based on:
    for each of the segments of the plurality:
        providing a first tangent line to the at least one boundary at the start point and a second tangent line to the at least one boundary at the end point
        providing a first vertex disposed on a first perpendicular line extended outwardly from the first tangent line at the start point, the first vertex is a predetermined distance (D) away from the start point;
        providing a second vertex disposed on a second perpendicular line extended outwardly from the second tangent line at the end point, the second vertex is D distance away from the end point; and
        defining the region of interest for the start point and the end point formed by a polygon with four vertices consisting of the start point, the end point, the first vertex, and the second vertex;

for each of the plurality of regions of interest:
calculating at least one parameter of interest within the region of interest; and
graphically presenting a segment between the start point and the end point on the at least one geographical boundary with a line thickness proportional to the calculation results.

11. The method of claim 10, wherein the step of dividing the at least one geographical boundary is based on a predetermined division of the at least one geographical boundary into the plurality of regions of interests.

12. The method of claim 10, wherein the step of calculating the at least one parameter of interest is based on integration.

13. The method of claim 10, further comprising:
smoothing transitions from one segment of the plurality of regions of interest to another.

14. The method of claim 13, wherein the smoothing is based on a moving average.

15. The method of claim 14, wherein the moving average is based on a window having between three points and 300 points.

16. The method of claim 1, wherein the line thickness is based on a thickness scale.

17. The method of claim 1, wherein the thickness of each segment is outward pointing away from the interior of the at least one geographical boundary.

18. The method of claim 17, wherein a curve fitting function is applied to transitions between segments of varying thicknesses.

* * * * *